Dec. 1, 1925.
J. C. PEWTHER
1,564,018
STEERING STABILIZER
Filed Dec. 16, 1924
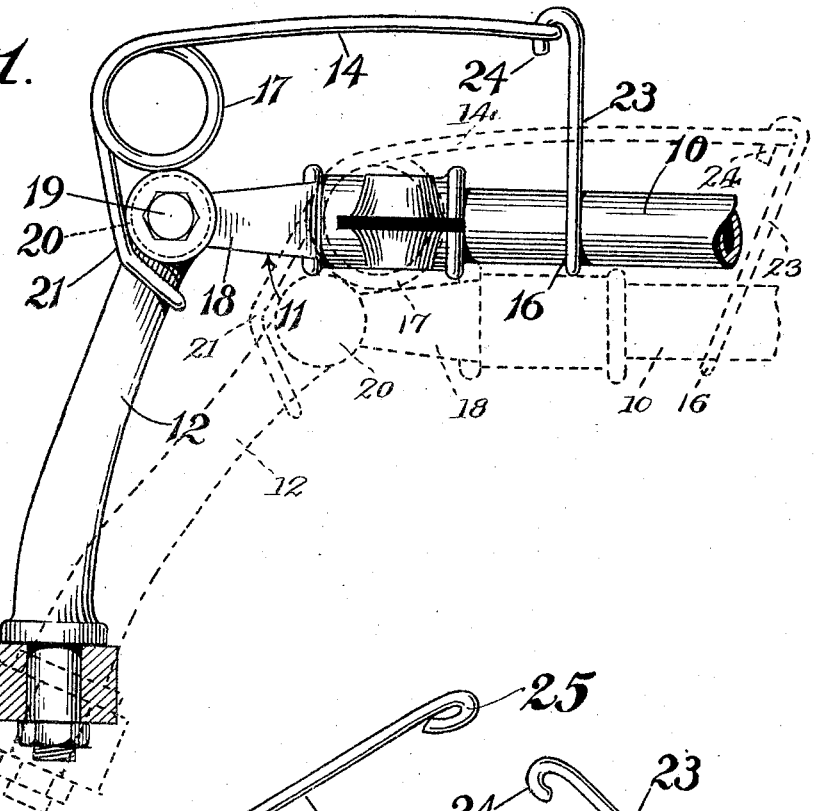
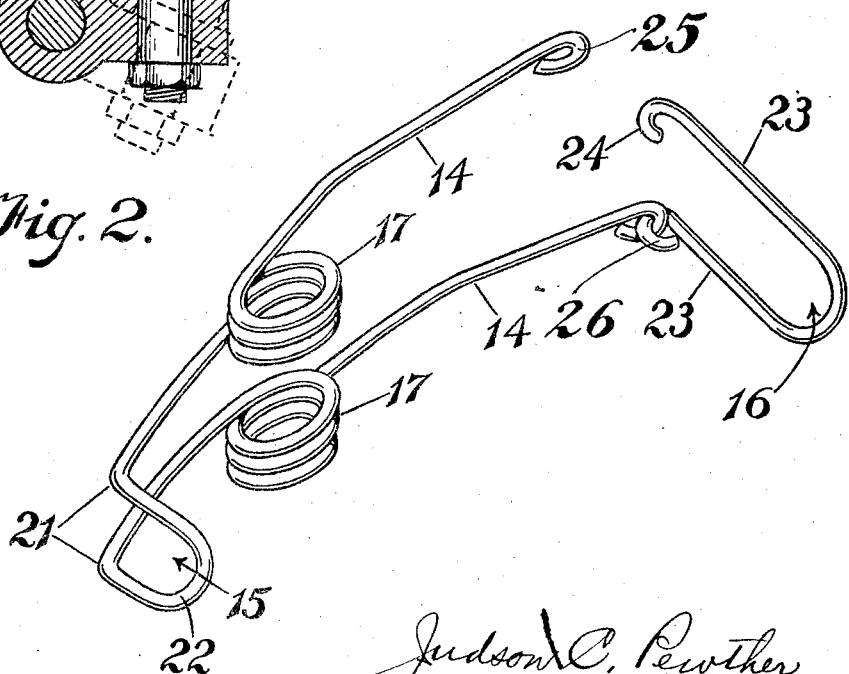

Patented Dec. 1, 1925.

1,564,018

UNITED STATES PATENT OFFICE.

JUDSON C. PEWTHER, OF WICHITA, KANSAS.

STEERING STABILIZER.

Application filed December 16, 1924. Serial No. 756,303.

*To all whom it may concern:*

Be it known that I, JUDSON C. PEWTHER, a citizen of the United States, residing at Wichita, in the county of Sedgwick and State of Kansas, have invented certain new and useful Improvements in a Steering Stabilizer, of which the following is a specification, reference being had to the accompanying drawings.

This invention relates to a combined anti-rattler and steering gear stabilizer for vehicles.

An important object of the invention is to provide a device of this character which will remove from the steering gear the vibratory motion often occurring in light cars and generally referred to as "shimmying."

A further object of this invention is to provide a device of the character described the action of which will not be hindered by ice or frozen mud.

A still further object of the invention is to provide a device of this character which may be readily applied to the steering gear of the vehicle without in any manner altering the construction thereof or disassembly of any of the points of connection of such steering mechanism.

These and other objects I attain by the construction shown in the accompanying drawings, wherein for the purpose of illustration is shown a preferred embodiment of my invention and wherein:—

Figure 1 is a plan view showing an anti-rattler constructed in accordance with my invention applied to the steering-arm and steering-arm connecting rod of the vehicle, the solid line position showing the normal position of the parts when the vehicle wheels are positioned straight ahead while the dotted line position shows the positions of the parts when the vehicle is turning to the left.

Figure 2 is a perspective view of the same when removed. Referring now more particularly to the drawings, the numeral 10 indicates the tie rod of a steering mechanism having at its ends bifurcated fittings 11, only one of which is shown, these bifurcated fittings receiving the rear ends of the steering arms 12 of a steering spindle 13. In the usual construction of a vehicle, these steering arms, when the wheels are in a position for straight ahead travel, extend approximately directly rearwardly to engage with the ends of the tie rod 10. When in travel of the vehicle, particularly when the vehicle is of light construction, the wheels are subjected to a succession of light blows tending to cause them to deviate from the straight path often start vibrating, particularly if there is any looseness in the steering mechanism. This vibration if once started is extremely difficult to stop or to control, becoming by its continuation extremely tiring upon the arms of the driver of the vehicle. In accordance with my invention, I provide a tensioning member comprising a body 14 having at one end a hook 15 engaging the steering arm 12 of the steering spindle 13 and at its opposite end a stirrup 16 engaging the tie rod 10 and intermediate its ends a coil 17 bearing upon and sliding against the bifurcated fitting 11 at the end of the tie rod.

The bifurcated fitting 11 has the arms 18 thereof rounded and fairly smooth, so that this sliding action is not interfered with and the coil 17 is arranged more nearly adjacent the hook 15 than the stirrup 16. The tensioning member is so constructed that no tension would be applied when the arm 12 and rod 10 were properly aligned, with the result that when in applied position this arm is placed always under a tension urging it toward alignment with the rod 10, with the result that it is held firmly against the pivot bolt 19 extending through the arms 18 and the arm 12 to connect the same and any rattling at this point is prevented. Furthermore, it will be obvious that movement of the steering tie rod 10 to one side or the other of its central position will cause one of the arms 12 to increase its angularity to the tie rod and the other of the arms to decrease such angularity, with the result that the tension of the two sets of coils which are provided on the vehicle will be unbalanced and there is a tendency of the tie rod at all times to return to the central position where this tension is balanced, thus normally maintaining the vehicle with the wheels thereof in straightway steering position. During movement of the arm with relation to the rod in which change of angularity is effected, there is a movement of the coil 17 upon the arms 18 due to the fact that the length of the body portion lying between the hook 15 and the loop is just sufficient to enable the hook 15 to be engaged about the arm forwardly of the enlargement 20 of the arm which engages in the bifurcated fitting 11. This being the case, that portion of the body lying between the coil and hook 15 comes into engagement with this enlargement and operates as a lever tending to shift the coil longitudinally of the member 10.

In the construction of this tensioning element, I preferably employ two lengths of wire, 14 and 23. The main body 14 is formed of a comparativley long piece of wire bent intermediate of its ends to form hooks 21 and 22, coils 17, and eyes 25.

Stirrup 23 is formed of a comparatively short piece of wire, bent intermediate its ends to form bearing 16 for tie rod 10, having small hooks 24 formed in its end to engage eyes 25. One of these hooks may be closed after engaging eye 25 as is shown at 26 to prevent loss of part 23.

In applying the device, the arms 14 are engaged with the hand and spread to separate the coils 17, and while thus separated are slid astride the steering arm 12 so that the bight of 21 forming a part of the hook 15 is engaged against inner face of the arm. The ends of the arms are then forced rearwardly and inwardly so that the coils are brought against the bifurcated element 11 and the stirrup 23 is passed around tie rod 10 thus engaging one of the arms. The other arm is forced inward until the eye 25 engages hook 24.

It will, of course, be obvious that this specific construction is capable of a certain change and modification and other means of providing a readily applicable tensioning element of the general construction above described might be provided. I accordingly do not limit myself to such specific structure as hereinbefore set forth except as hereinafter claimed.

I claim:—

1. The combination with two members disposed at an angle and pivotally connected at their adjacent ends, of a resilient body disposed upon the exterior of the angle between the members and having connection with one of the members whereby it is rendered rigid to the member, the opposite end of the body having a stirrup pivoted thereto for rocking movement and engaging the other of said members and by its engagement tending to move said other member into alignment with the first named member, the rocking movement of the stirrup permitting shifting of the resilient body upon the pivotal connection of the members without longitudinal movement of the stirrup upon the other of said members at the point of its engagement therewith.

2. The combination with two members disposed at an angle and pivotally connected at their adjacent ends, of a resilient body disposed upon the exterior of the angle between the members and having connection with one of the members whereby it is rendered rigid to the member, the opposite end of the body having a stirrup pivoted thereto for rocking movement and engaging the other of said members and by its engagement tending to move said other member into alignment with the first named member, the rocking movement of the stirrup permitting shifting of the resilient body upon the pivotal connection of the members without longitudinal movement of the stirrup upon the other of said members at the point of its engagement therewith, the last named end of the body having two arms to one of which the stirrup is permanently pivotally connected, the opposite arm of the body having an eye, the free end of the stirrup having a hook for engagement in said eye after the stirrup has been passed about the member.

3. In combination with the tie rod of automobile steering mechanism and with the steering spindle arm pivotally engaged with the end of the tie rod and disposed at an angle thereto, a member hooked at one end about the steering spindle arm having intermediate its ends a coil slidably abutting said pivotal connection between the steering spindle arm and the tie rod and a stirrup connected with the opposite end of the member for rocking movement and engaged with the tie rod at a point spaced longitudinally of the tie rod from said pivotal connection.

In testimony whereof I hereunto affix my signature.

JUDSON C. PEWTHER.